(12) United States Patent
Van Arendonk et al.

(10) Patent No.: US 6,758,608 B2
(45) Date of Patent: Jul. 6, 2004

(54) OPTICAL COMPONENT AND METHOD OF MANUFACTURING THE SAME

(75) Inventors: Anton Petrus Maria Van Arendonk, Eindhoven (NL); Gregory Le Kreider, Eindhoven (NL); Cornelis Draijer, Eindhoven (NL); Hendricus Dijkman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 238 days.

(21) Appl. No.: 09/932,101

(22) Filed: Aug. 17, 2001

(65) Prior Publication Data

US 2002/0067897 A1 Jun. 6, 2002

(30) Foreign Application Priority Data

Aug. 18, 2000 (EP) .............................................. 00202901

(51) Int. Cl.[7] .................................................. G02B 6/36
(52) U.S. Cl. ........................................... 385/89; 385/80
(58) Field of Search .............................. 385/89, 12, 27, 385/80, 129, 131

(56) References Cited

U.S. PATENT DOCUMENTS

| 4,375,909 A | * | 3/1983 | Bos ............................. 359/453 |
| 4,500,397 A | * | 2/1985 | Mori .......................... 204/487 |
| 5,084,880 A | | 1/1992 | Esterowitz et al. ............ 372/71 |
| 5,166,515 A | * | 11/1992 | Attridge ................ 250/227.25 |
| 5,369,717 A | | 11/1994 | Attridge ....................... 385/12 |
| 6,157,027 A | * | 12/2000 | Watanabe et al. ........... 250/234 |

* cited by examiner

Primary Examiner—Chandrika Prasad
(74) Attorney, Agent, or Firm—Aaron Waxler

(57) ABSTRACT

The optical component comprises a first element (1) having a light-emission surface (2) and a second element (3) having a light-entrance surface (4), a bonding layer (5) interconnecting the elements (1, 3) being provided between said surfaces (2, 4). The bonding layer (5) is an optically transparent layer of paraffin, which efficiently couples light from the first element (1) into the second element (3) and carefully positions said elements (1, 3) with respect to each other. In the method of manufacturing the optical component, the first element (1) and the second element (3) are fitted together by joining the surfaces (2, 4) so as to form a capillary space (7), which capillary space (7) is filled by making it suck up liquid paraffin, the paraffin is allowed to cool and solidified in order to form an optically transparent bonding layer (5) of paraffin in the capillary space (7).

15 Claims, 3 Drawing Sheets

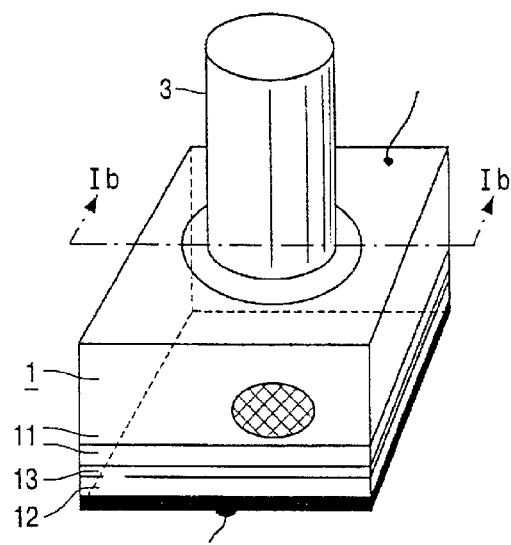
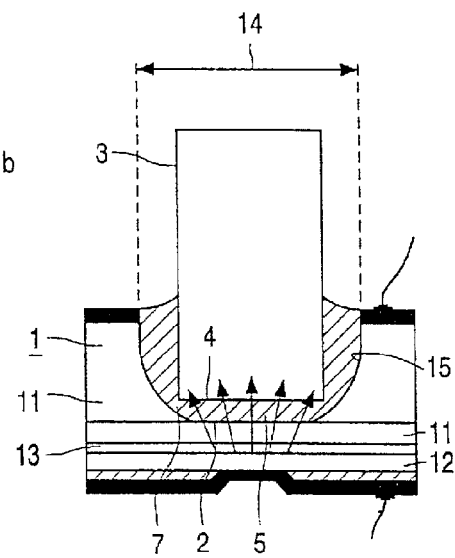
FIG. 1a  FIG. 1b
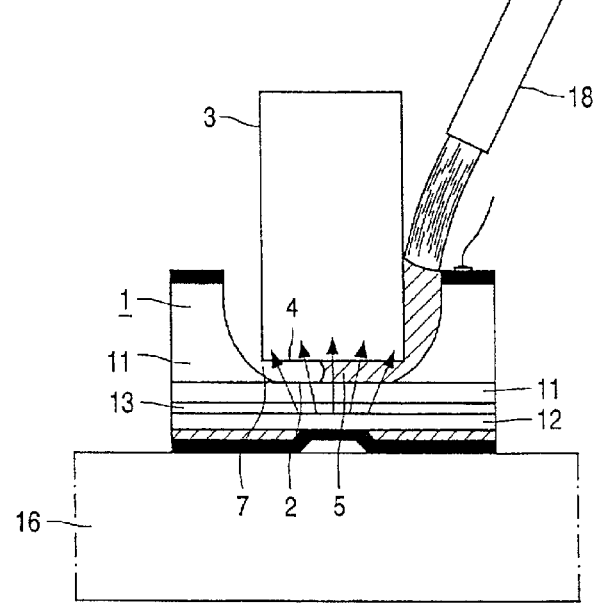
FIG. 1c

OPTICAL COMPONENT AND METHOD OF MANUFACTURING THE SAME

The invention relates to an optical component comprising a first element having a light-emission surface and a second element having a light-entrance surface, a bonding layer interconnecting said elements being situated between said surfaces.

The invention also relates to a method of manufacturing an optical component comprising a first element having a light-emission surface and a second element having a light-entrance surface, a bonding layer interconnecting said elements being situated between said surfaces.

Such an optical component and a method of manufacturing said component are disclosed in U.S. Pat. No. 5,074,683.

In the known method, two optical elements are interconnected by means of the bonding layer, a distance which is to be varied being provided by a spacer layer. Said spacer layer is provided only over a part of the first optical element, as a result of which an open space is formed between the first and the second optical element, which space is filled with a coupling mass having a refractive index which is essentially equal to the refractive index of the first optical element. The coupling mass is an epoxy, a gel or a comparable material.

The space between the surface of the first optical element and the surface of the second element is accurately adjustable by choosing the thickness of the spacer layer. The thickness of the spacer layer is typically 600 $\mu$m. The known method is predominantly used to secure a fiber optic faceplate to sensors comprising charge-coupled devices (CCDs). The coupling mass is predominantly provided between the fiber optic faceplate and the active region of the sensor in order to obtain a satisfactory optical coupling without causing damage to the CCD sensor.

A drawback of the known method resides in that epoxies and gels generally shrink as a result of drying of the layer. If the epoxy or the gel is provided on the active part of a CCD sensor, the lifetime of the sensor is adversely affected by mechanical stresses. Wires establishing an electrical connection between the sensor and an envelope may become detached or, in the course of time, be subject to breakage.

A further, important drawback of the known coupling mass resides in that bubbles often develop in the epoxy and in the gel between the CCD sensor and the fiber optic faceplate, as a result of which the sensor becomes useless. Failure of such sensors at the end of the manufacturing process is very expensive.

It is an object of the invention to provide an optical component of the type described in the opening paragraph, which can be produced in a reliable and simple manner.

Another object of the invention is to provide a method of manufacturing an optical component of the type described in the opening paragraph, which method can be carried out in a reliable and simple manner, and which enables product failure to be reduced substantially.

As regards the optical component, this object is achieved in accordance with the invention in that the bonding layer is a transparent layer of paraffin.

Optical components, such as optical interconnects, are frequently used in data communication systems and in multi-chip modules. An optical interconnect may be a hybrid chip wherein GaAs is used for the photonics and Si is used for the electronics. The first element having a light-emission surface is, for example, a GaAs laser or light-emitting diode (LED), the second element having a light-entrance surface is, for example, a photodetector. The GaAs laser or the LED and the Si photodetector are coupled to each other by a transparent layer of paraffin, and bonding wires are frequently used for their final assembly in an envelope. The transparent layer of paraffin of the optical component in accordance with the invention is an excellent bonding layer and a medium having a good transmission in the wavelength range of visible light. As paraffin is comparatively soft with respect to epoxies or gels, mechanical stresses transferred to the elements, such as lasers or photodetectors, are very small. Problems regarding the lifetime of the elements caused by the bonding layer are precluded, as are the problems of the bonding wires becoming detached or being subject to breakage. The optical component can be manufactured by applying liquid paraffin to the light-emission surface of the first element and placing the second element with the light-entrance surface on said light-emission surface.

The optical component may have a capillary space between the light-emission surface and the light-entrance surface of the elements. Said capillary space is filled with the transparent layer of paraffin. The optical component can be obtained, for example, by joining the first element and the second element by bringing together their surfaces so as to form a capillary space, filling said capillary space by making it suck up liquid paraffin, cooling the paraffin and solidifying the paraffin so as to obtain a bonding layer of transparent paraffin in the capillary space.

An advantage of the transparent layer of paraffin is that the adhesion between the light-emission surface and the light-entrance surface of the elements is very good as a result of the Van der Waals' forces. If the paraffin is present in a capillary space, the amount of material disappearing at the sides of the capillary space is very small, which can be partly attributed to the low vapor pressure of paraffin.

Paraffin is a mixture of aliphatic hydrocarbons. In the solid state, paraffin is a white to light yellow greasy paste. Dependent upon the composition of the mixture, the melting point of paraffin lies in the range between 45 and 65° C. For practical applications, it is advantageous if the transparent paraffin layer is a solid at temperatures below 50° C. If the elements are improperly attached to each other, for example improperly aligned, they can be readily detached by heating the paraffin layer in the capillary space to a temperature above the melting point. By virtue thereof, the number of optical components rejected during their manufacture is substantially reduced.

Advantageously, the degree of light scattering in the medium between the elements is low in order to minimize optical losses. A short distance between the optical elements is very favorable. Preferably, optical losses above 10% are precluded, so that the thickness chosen for the paraffin layer is maximally 200 $\mu$m.

By minimizing the distance to the surface roughness of the surfaces, there is only a small variation in thickness of the layer and light scattering is virtually limited to Rayleigh scattering.

Favorably, reflections at surfaces are precluded as much as possible. By choosing the refractive index of the material of the bonding layer to be as close as possible to the refractive index of the elements, reflections of the light at the surface are reduced substantially. Paraffin has a favorable refractive index for visible light of typically 1.440–1.484, which is rather close to the refractive index of materials which are important in the semiconductor technology, such as quartz having a refractive index of 1.46. By virtue thereof, a quartz plate accommodating a bundle of optical fibers can be coupled substantially without reflections, via the paraffin layer, to an SiO₂ passivation layer on the surface of a Si semiconductor detector.

Image pick-up devices, such as cameras, camcorders and digital cameras generally comprise an image sensor. The image sensor comprises an array of light-sensitive pixels. The light is converted per pixel into an electric signal by a solid state image device, for example a photodiode or a CCD.

Apart from a light-receiving image sensor, a pick-up device generally also comprises a plate accommodating a bundle of fibers which open into the light-emission surface. The transparent paraffin layer extends between the plate and the light-entrance surface of the image sensor. The plate is accurately fixed with respect to the image sensor by the paraffin. Light is incident on one or more pixels of the image sensor via an optical fiber. The amount of light per pixel is converted into an electric signal that is used to build up an image after electronic signal processing.

The object of the invention with regard to the method is achieved in accordance with the invention in that the first and the second element are fitted together by joining the surfaces so as to form a capillary space, which capillary space is filled by making it suck up liquid paraffin, the paraffin is cooled and solidified in order to obtain a bonding layer of transparent paraffin in the capillary space.

A very favorable effect of the method in accordance with the invention resides in that minimization of the surface energy between the elements causes the process wherein liquid paraffin is sucked up to continue until the capillary space is filled. Very surprisingly, it has been found that the paraffin layer remains transparent after solidification. By using this method, no, or hardly any, bubbles develop in the layer of paraffin. The method is very simple and inexpensive. Product failure in a late stage of the production process is precluded in that the elements can be readily detached by heating the paraffin to a temperature above the melting point. The method can then be repeated.

Favorably, the elements are subjected to pressure during the process wherein liquid paraffin is sucked up. As a result of said pressure, the elements cannot move with respect to each other, so that they remain more accurately positioned with respect to each other.

These and other aspects of the invention will be apparent from and elucidated with reference to the embodiment(s) described hereinafter.

In the drawings:

FIG. 1a is a diagrammatic, perspective view of a first embodiment of the optical component;

FIG. 1b is a cross-sectional view of the first embodiment of the optical component taken on the line Ib—Ib in FIG. 1a.

FIG. 1c is a cross-sectional view of an intermediate product of the component of FIG. 1, wherein the liquid paraffin is sucked up;

Figure 2:
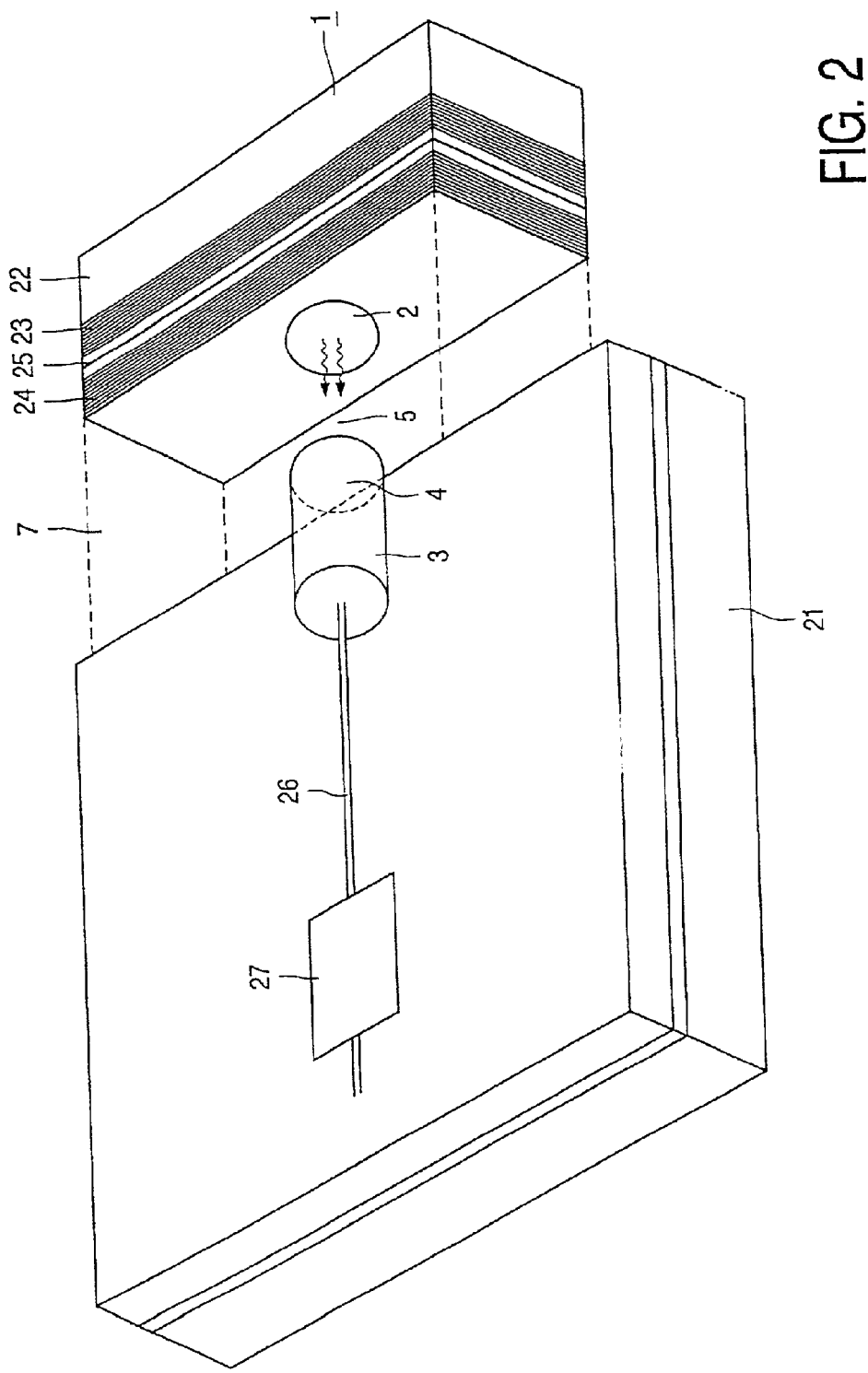
FIG. 2 is a perspective view of a second embodiment of the optical component.

The optical component shown in FIGS. 1a and 1b comprises a first element 1 having a light-emission surface 2 and a second element 3 having a light-entrance surface 4, a bonding layer 5 interconnecting the elements 1, 3 being situated between the surfaces 2, 4. The bonding layer 5 is a transparent layer of paraffin. In the embodiment shown, the optical component is an optical interconnect wherein the first element 1 is a light-emitting diode (LED) and the second element 3 is a fiber, which are connected to each other by the transparent layer of paraffin. The LED is a heterojunction LED, which is composed of a $Al_xGa_{1-x}As/Al_yGa_{1-y}As$ (x<y) heterostructure. The GaAs substrate comprises n-doped regions 11 and p-doped regions 12. The injected charge carriers in the LED are enclosed in a narrow region 13 where recombination takes place. As the material around the recombination region has a larger bandgap, the internal optical absorption is small. Light having a wavelength of 0.85 $\mu$m is emitted by the light-emission surface 2. An etched opening 14 in the n-doped region 11 enables the light-entrance surface 4 of the fiber to be arranged close to the light-emission surface 2. The diameter of the core of the fiber is slightly larger than the horizontal part of the light-emission surface 2. The diameter of the core of the fiber is typically 80 $\mu$m.

In FIG. 1a, the paraffin fills a capillary space 7. In the embodiment shown, the capillary space 7 is situated between the light-emission surface 2 of the first element 1, i.e. the LED, and the light-entrance surface 4 of the second element 3, i.e. the fiber. The paraffin fixes the elements 1, 3.

The transparent layer of paraffin is a solid at temperatures below 50° C. In the embodiment shown, the normal operating temperature of the LED is typically 20° C. As a result of a large current, the temperature of the LED may locally increase to approximately 40° C. At a temperature increase from 20 to 40° C., the power emission of the LED decreases by a factor of approximately 1.6. The difference in power emission can be attributed to a smaller barrier height of the heterojunction at a higher temperature, as a result of which the charge carriers are no longer entirely enclosed in the narrow region 13 where recombination takes place. To make sure that the paraffin does not liquify locally, the paraffin, in the embodiment shown, is a solid substance at a temperature below 50° C.

In FIG. 1, the layer of paraffin has a thickness of maximally 200 $\mu$m. In the embodiment shown, the fiber is fixed by the layer of paraffin at such a small distance from the LED that spreading of the light beam between the light-emission surface 2 and the light-entrance surface 4 of the fiber is substantially precluded. By varying the steepness of the walls 15 of the opening 14, the thickness of the layer of paraffin can be accurately adjusted. The shape of the light beam is approximately a Lambertian whose intensity depends upon an angle $\theta$ between the emitted direction of the light and the normal to the emitting surface. The intensity of the light beam has an angle-dependence in accordance with $I(\theta)=I_0 \cos \theta$. At a thickness of the paraffin layer of 200 $\mu$m, the intensity still is substantially equal to the maximum intensity $I_0$.

In the embodiment shown, the paraffin layer and the second element 3 have a substantially equal refractive index at the light-entrance surface 4.

Without the paraffin layer, a small additional Fresnel reflection loss occurs at the interface between air and the light-entrance surface 4 of the fiber. In a surface emitting LED, this loss can be eliminated by filling the capillary space 7 between the light-emission surface 2 and the light-entrance surface 4 with a material having a suitable refractive index. A significant loss ranging from 5 to 20% may still occur, however, as a result of different refractive indices at the light-emission surface 2 of the LED and the material with which the capillary space 7 is filled. The loss at both surfaces can be limited to maximally 4% for a fiber having a numerical aperture of 0.15 by using a thin paraffin layer between the LED and the fiber.

The optical component in the embodiment shown in FIGS. 1a and 1b can be manufactured, see FIG. 1c, by fitting together the first element 1 and the second element 3 by joining the surfaces 2, 4 so as to form a capillary space 7. Preferably, the fiber is placed with the light-entrance surface 4 on the light-emission surface of the LED. The LED and the fiber are placed, for example, on a baking sheet 16 and heated to a temperature above the melting point of the paraffin. Heating may alternatively take place, for example, in an oven. The paraffin in a reservoir 17 is heated to a temperature above the melting point, typically to approximately 60–80° C. At an open side of the capillary space 7, liquid paraffin is supplied, preferably, through a supply tube 18. The capillary space 7 is filled by making it suck up liquid paraffin. The liquid paraffin is drawn into the capillary space 7 as a result of the surface tension of the liquid paraffin between the surfaces 2, 4 of the elements 1, 3. As long as the paraffin is in the liquid state, the system keeps striving to reduce the surface energy to a minimum, as a result of which the process of sucking up liquid paraffin continues until the entire capillary space 7 is filled with paraffin. The supply of liquid paraffin is stopped. The temperature of the baking sheet 16 is reduced to below the melting point of the paraffin, causing the paraffin to cool and solidify. A bonding layer 5 of transparent paraffin is formed in the capillary space 7.

In the method shown in FIG. 1c, the elements 1, 3, are fitted together by joining the surfaces 2, 4. In the embodiment shown, the light-entrance surface 4 of the fiber is firmly pressed against the light-emission surface 2 of the LED. The fiber is fixed, for example, in a holder or a pair of tweezers and can be accurately positioned, use being made, for example, of a light microscope to determine the proper position of the fiber in the opening 14. When the paraffin is being sucked into the capillary space 7, the fiber remains accurately positioned by subjecting it to only a small pressure of 2000 Pa. By virtue of this method, no, or hardly any, bubbles are enclosed in the paraffin layer.

Figure 3:
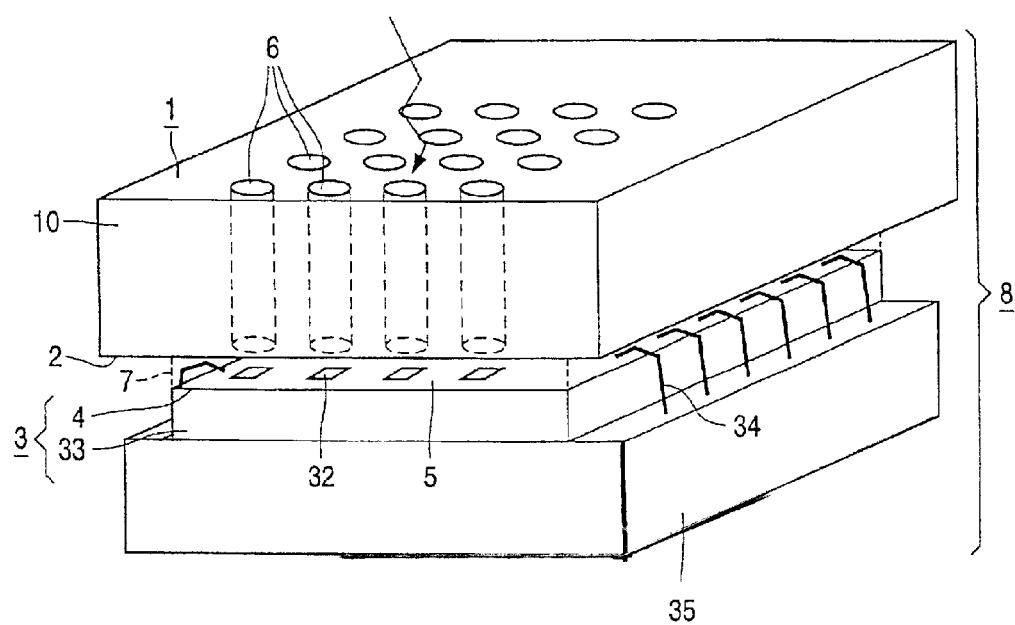
FIG. 3 is a perspective view of a third embodiment of the optical component.

In FIG. 2 and FIG. 3, parts corresponding to parts of FIG. 1a, 1b or 1c are indicated by means of the same reference numeral.

The second embodiment of the optical component depicted in FIG. 2 diagrammatically shows an optical interconnect in a multichip module. The first element 1 of the optical interconnect is a laser on a GaAs substrate 22, and the second element 3 of the optical interconnect is a light-receiving optoelectronic, integrated circuit on a silicon-on-insulator (SOI) substrate 21. Between the laser on the GaAs substrate 22 and the SOI substrate 21 there is the capillary space 7, which is filled with the transparent bonding layer 5 of paraffin. The efficiency with which the light originating from the laser is transmitted via the paraffin layer to the light-entrance surface 4 of the optical fiber depends on the wavelength of the light. The laser is, for example, a vertical cavity surface emitting laser with a circular light emission at right angles to the light-emission surface 2. The vertical cavity surface emitting laser 1 is typically manufactured on a GaAs substrate 22 on which n-doped layers 23 and p-doped layers 24 are grown by means of metal organic chemical vapor deposition (MOCVD). The laser comprises a central optical cavity 25 surrounded by the n-doped layers 23 and the p-doped layers 24, which serve as optical waveguides. Circular light beams having a wavelength of typically 0.85 $\mu$m and a small divergence are coupled into an optical fiber via the paraffin layer and transmitted to a photodetector 27 of, for example, SiGe(C) via a waveguide 26. Optical interconnects between chips or on board of the chip increase the speed and are important for high-frequency data communication.

The second element 3 of the optical component shown in FIG. 3 is a light-receiving image sensor which, in conjunction with the first element 1, forms an image pick-up device 8. The image sensor is preferably made in a Si substrate 33. The transparent bonding layer 5 of paraffin is situated between the first element 1 and the second element 3. The paraffin fills a capillary space 7. The image pick-up device 8 is used, for example, in an X-ray image detector for radiology. X-rays are converted by a scintillator to visible light which is incident on the light-receiving image sensor.

In the embodiment shown, the first element 1 is a plate 10 accommodating a bundle of fibers 6, which open into the light-emission surface 2. The plate 10 is preferably made of glass. The paraffin layer fixes the glass plate 10. Visible light is incident on the light-receiving image sensor via the bundle of optical fibers 6. The image sensor comprises an array of light-sensitive pixels 32. The light from a fiber is incident on one or more pixels. The light is converted per pixel into an electric signal by a solid state image device, for example a photodiode or a CCD. The dimensions of a pixel 32 are typically 12 $\mu$m by 12 $\mu$m. In such a pixel, the incident light generates charge carriers in the silicon substrate 33, which are collected and electronically enhanced in the periphery of the array. The incident light is converted, with a high efficiency, into an electric signal. The imperfection of the Modulation Transfer Function is of the order of 10% for the larger pixel dimensions of 12 $\mu$m by 12 $\mu$m. As paraffin is comparatively soft with respect to epoxies or gels, mechanical stresses transferred to the image sensor are small. For the final assembly of the image sensor in the envelope 35 use is made of bonding wires 34. Said bonding wires 34 are generally surrounded by paraffin.

The transparent paraffin layer is a solid substance at temperatures below 50° C. The operating temperature of image sensors is typically 20° C. The image sensors are tested for, inter alia, dark current and service life at an increased temperature of approximately 40° C. Therefore, it is desirable in this application that the transparent layer of paraffin is a solid substance below 50° C.

The maximum thickness of the paraffin layer is 200 $\mu$m. In this embodiment, the thickness of the transparent paraffin layer depends, inter alia, on the surface roughness of the glass plate 10 and the surface roughness of the image sensor. The roughness of the glass plate 10 in the embodiment shown is typically 35 $\mu$m. The image sensor in the Si substrate 33 has a topography of 4 $\mu$m and is preferably passivated with a $Si_3N_4$ and/or a $SiO_2$ layer. The surface roughness of the passivation layer can be reduced to several tens of nanometers by means of chemical-mechanical polishing. Consequently, typical roughnesses of the image sensor comprising a passivation layer are negligible in comparison with the roughness of the glass plate 10.

The transparent layer of paraffin and the second element 3 have a substantially equal refractive index at the light-entrance surface 4. As a result of the favorable refractive index of the paraffin layer of typically 1.440–1.484, visible light having a wavelength in the range from 0.15 $\mu$m to 4.5 $\mu$m is very efficiently, i.e. at an optical loss of only 4%, coupled into the $SiO_2$ passivation layer of the image sensor having a refractive index of 1.46. Without the paraffin layer the loss in vacuum is 10%.

The optical component in the embodiment shown in FIG. 3 can be manufactured by fitting together the first element 1 and the second element 3 by joining the surfaces 2, 4 so as to form a capillary space 7. Preferably, the glass plate 10 is provided with the light-emission surface 2 accommodating the bundle of optical fibers 6 on the light-entrance surface 4 of the image sensor. The image sensor with the glass plate 10 is preferably provided on a baking sheet 16 and heated to a temperature well above the melting point of the paraffin. Heating can also take place, for example, in an oven or on a hot plate. The paraffin present, for example, in a reservoir 17 is heated to a temperature above the melting point, typically around 60–80° C. At an open side of the capillary space 7, liquid paraffin is supplied, preferably through a supply tube 18. The capillary space 7 is filled by making it suck up liquid paraffin. The liquid paraffin is sucked into the capillary space 7 as a result of the surface tension of the liquid paraffin between the surfaces 2, 4 of the elements 1, 3. As long as the paraffin remains in the liquid state, the system strives to reduce the surface energy to a minimum, so that the process of sucking up liquid paraffin continues until the entire capillary space 7 is filled with paraffin. By discontinuing the heating of the image sensor in the Si substrate 33 with the glass plate 10, the paraffin cools and solidifies. A transparent bonding layer 5 of paraffin is formed in the capillary space 7.

The elements 1, 3 are pressed against each other with the surfaces 2, 4. In the embodiment shown, a force is exerted by, for example, a sheet or a block of metal on the glass plate 10. By exerting only a small pressure of 2000 Pa on the glass plate 10, the glass plate 10 remains in place and the volume of the capillary space 7 remains substantially constant during the process of sucking up liquid paraffin. By applying this method, no, or hardly any, bubbles are trapped in the paraffin layer.

What is claimed is:

1. An optical component comprising:
   a first element with at least one opening and a light-emission surface;
   a second element with a light-entrance surface; and
   a bonding layer interconnecting said elements being situated between said surfaces,
   wherein said bonding layer is a transparent layer of paraffin.

2. The optical component of claim 1, wherein said paraffin fills a capillary space.

3. The optical component of claim 1, wherein said transparent layer of paraffin is a solid substance at temperatures below 50° C.

4. The optical component of claim 1, wherein said layer of paraffin has a thickness of maximally 200 μm.

5. The optical component of claim 1, wherein said transparent layer of paraffin and the second element have essentially equal refractive indices at the light-entrance surfaces.

6. The optical component of claim 1, wherein said second element is a light-receiving image sensor which, in conjunction with the first element, forms an image pick-up device.

7. The optical component of claim 6, wherein said first element is a plate accommodating a bundle of fibers which open into the light emission surface.

8. A method of manufacturing an optical component comprising a first element with at least one opening and a light-emission surface and a second element with a light-entrance surface, a bonding layer interconnecting said elements being situated between said surfaces, wherein said first element and said second element are fitted together by joining said surfaces so as to form a capillary space, which capillary space is filled by making it suck up liquid paraffin, said paraffin is cooled and solidified so as to form a boding layer of transparent paraffin in said capillary space.

9. The method of claim 8, wherein said surfaces of the said elements are pressed against each other.

10. The method of claim 8, wherein said opening of said first element enables said light-entrance surface to be close to said light-emission surface.

11. The method of claim 8, wherein one or more walls of said opening may be varied for accurate adjustment of said bonding layer.

12. The method of claim 8, wherein at least a portion of said second element engages said opening.

13. The optical component of claim 1, wherein said opening of said first element enables said light-entrance surface to be close to said light-emission surface.

14. The optical component of claim 1, wherein said opening has walls that may be varied for accurate adjustment of said bonding layer.

15. The optical component of claim 1, wherein at least a portion of said second element engages said opening.

* * * * *